US008654154B2

(12) United States Patent
Niemi et al.

(10) Patent No.: US 8,654,154 B2
(45) Date of Patent: Feb. 18, 2014

(54) METHOD FOR PROCESSING A DIGITAL IMAGE

(75) Inventors: Sami Niemi, Skanör (SE); Johan Stén, Malmö (SE)

(73) Assignee: Mobile Imaging in Sweden AB, Lund (SE)

( * ) Notice: Subject to any disclaimer, the term of this patent is extended or adjusted under 35 U.S.C. 154(b) by 608 days.

(21) Appl. No.: 12/031,884

(22) Filed: Feb. 15, 2008

(65) Prior Publication Data

US 2008/0198177 A1    Aug. 21, 2008

(30) Foreign Application Priority Data

Feb. 16, 2007    (SE) ...................................... 0700446

(51) Int. Cl.
| | |
|---|---|
| G09G 5/00 | (2006.01) |
| G06F 15/00 | (2006.01) |
| G06K 9/36 | (2006.01) |
| G06K 9/20 | (2006.01) |
| G06K 9/32 | (2006.01) |
| G06K 9/54 | (2006.01) |
| G06F 3/048 | (2013.01) |
| G06F 3/14 | (2006.01) |

(52) U.S. Cl.
USPC ............ 345/667; 345/619; 345/660; 358/1.1; 358/1.2; 382/232; 382/276; 382/282; 382/298; 382/299; 382/300; 382/305; 715/788; 715/800; 715/864

(58) Field of Classification Search
USPC ........... 345/472, 472.1–472.2, 660, 667–671, 345/619; 348/63, 561, 240.99, 240.1, 348/240.2; 358/1.1, 1.2, 1.9, 537, 538, 448, 358/452, 453; 382/232, 235, 276, 282, 382/298–300, 305; 715/764, 788, 798, 800, 715/801, 864
See application file for complete search history.

(56) References Cited

U.S. PATENT DOCUMENTS

| | | | |
|---|---|---|---|
| 4,967,196 A | 10/1990 | Sprague et al. | |
| 5,349,348 A | 9/1994 | Anderson et al. | |

(Continued)

FOREIGN PATENT DOCUMENTS

| | | |
|---|---|---|
| EP | 1584937 | 10/2005 |
| GB | 2435334 | 8/2007 |

(Continued)

OTHER PUBLICATIONS

PCT International-Type Search Report, Search request No. ITS/SE07/00085; Date of request Feb. 16, 2007.

(Continued)

*Primary Examiner* — Wesner Sajous
*Assistant Examiner* — Andrew Shin
(74) *Attorney, Agent, or Firm* — Alston & Bird LLP

(57) ABSTRACT

A method for varying a view of a digital image to be sent to a display. The method comprises retrieving image data representing a first area of the digital image from a reduced size, in regard of number of pixels, representation of the digital image, sending the retrieved image data representing the first area to the display, receiving a user input signal requesting a second area to be sent to the display, retrieving image data representing the second area of the digital image from the reduced size representation of the digital image, and sending the retrieved image data representing the second area to the display.

23 Claims, 7 Drawing Sheets

(56) References Cited

U.S. PATENT DOCUMENTS

| | | |
|---|---|---|
| 6,281,874 B1 | 8/2001 | Sivan et al. |
| 6,308,257 B1 | 10/2001 | Theogarajan et al. |
| 6,381,371 B1 * | 4/2002 | Epstein et al. ............... 382/246 |
| 6,553,145 B1 | 4/2003 | Kang et al. |
| 6,560,745 B1 | 5/2003 | McCloskey et al. |
| 6,693,566 B2 | 2/2004 | Jaffe et al. |
| 6,947,599 B2 | 9/2005 | Takemura |
| 6,950,043 B2 | 9/2005 | Kikuchi et al. |
| 7,076,104 B1 | 7/2006 | Keith et al. |
| 7,146,053 B1 | 12/2006 | Rijavec et al. |
| 7,463,775 B1 | 12/2008 | Sites |
| 2002/0105531 A1 | 8/2002 | Niemi et al. |
| 2004/0086041 A1 | 5/2004 | Ye et al. |
| 2004/0175047 A1 | 9/2004 | Gormish et al. |
| 2004/0175059 A1 | 9/2004 | Willner et al. |
| 2005/0008236 A1 | 1/2005 | Hachiyama et al. |
| 2005/0174457 A1 | 8/2005 | Yoshino et al. |
| 2005/0206658 A1 | 9/2005 | Fagans |
| 2006/0023953 A1 * | 2/2006 | Kliorin et al. ............... 382/232 |
| 2006/0182274 A1 | 8/2006 | Nicolai et al. |
| 2006/0233257 A1 | 10/2006 | Keith et al. |
| 2006/0269147 A1 | 11/2006 | Shen et al. |
| 2008/0198177 A1 | 8/2008 | Niemi et al. |

FOREIGN PATENT DOCUMENTS

| | | |
|---|---|---|
| JP | 02-014620 | 1/1990 |
| JP | 07-086956 | 3/1995 |
| JP | 10-336494 | 12/1998 |
| JP | 10-341345 | 12/1998 |
| JP | 2003-087715 | 3/2003 |
| JP | 2003-087716 | 3/2003 |
| JP | 2003/198378 | 7/2003 |
| JP | 2004-276731 | 10/2004 |
| JP | 2005-223765 | 8/2005 |
| JP | 2010-519571 | 6/2010 |
| WO | WO-0109836 | 2/2001 |
| WO | WO-0109836 A1 | 2/2001 |
| WO | WO-0233976 | 4/2002 |
| WO | WO-0233976 A1 | 4/2002 |
| WO | WO-2005/032119 | 4/2005 |
| WO | WO-2005/032119 A1 | 4/2005 |
| WO | 2005050567 A1 | 6/2005 |
| WO | 2006/085223 | 8/2006 |
| WO | WO-2008/100206 | 8/2008 |

OTHER PUBLICATIONS

Cohen et al., "SQL.CT: Providing Data Management for Visual Exploration of CT Datasets," 18$^{th}$ International Conference on Scientific and Statistical Database Management, pp. 143-148 (Jul. 2006).

Hauf et al., "The Flashpix™ Image File Format," Final Program and Proceedings of the IS&T/SID Color Imaging Conference: Color, Science, Systems, and Applications, pp. 234-238 (Jan. 1996).

Talagala et al., "Usage patterns of a Web-based image collection," 16$^{th}$ IEEE Symposium on Mass Storage Systems, pp. 203-214 (Mar. 1999).

Taubman et al., "Architecture, Philosophy and Performance of JPIP: Internet Protocol Standard for JPEG2000," Proceedings of the Spie, The International Society for Optical Engineering Spie, vol. 5150, No. 1, pp. 791-805 (Jan. 2003).

Zoomify et al., "Zoomify Technology and Products—White Paper," (Oct. 2003).

Satoshi Asami and David A. Patterson "GridPix—Presenting Large Image Files Over the Internet" Report No. UCB/CSD-00-1099, May 1, 2000 Computer Science Division (EECS) of University of California, Berkeley, CA 94720 XP55031220, pp. 1-10.

Japanese Office Action for Application No. 2009-549554 dated Jan. 16, 2013.

European Search Report for Application No. 08712716.3; dated Sep. 28, 2010.

European Search Report for Application No. 08712716.3; dated Nov. 27, 2011.

European Search Report for Application No. 08712716.3; dated Jul. 10, 2012.

International Search Report for Application No. PCT/SE2008/000125, dated Jul. 8, 2008.

Office Action for European Application No. 08 712 716.3; dated Jul. 19, 2013.

Office Action for Japanese Application No. 2009-549553; dated Dec. 17, 2012.

* cited by examiner

METHOD FOR PROCESSING A DIGITAL IMAGE

TECHNICAL FIELD OF INVENTION

The present invention relates to a method for varying a view of a digital image sent to a display and a data structure for storing a digital image on a handheld device.

BACKGROUND TO THE INVENTION

Today images, such as photographs, still pictures, graphics etc., are commonly viewed in any electronic device having a display. However, it is not enough to enable images being viewed on a display. The users of electronic devices displaying images on a display are in most cases interested in be able to alter the view of the image. Some common operations requested by the user are to zoom into an image to view details of the image, pan in the zoomed image in order to trace a feature or just to get an overview of the details, rotate images in order to facilitate viewing on the display, etc. Moreover, the images handled by users of such electronic devices are of increasing resolution, i.e. the number of pixels defining an image becomes greater and greater.

The electronic devices may, for example, be mobile telephones, personal digital assistants, palm tops, or other devices having limited processing capacity in view of the images to be handled. For instance, a lot of the electronic devices having a display for viewing images do not include enough processing capacity to perform operations such as zoom, pan, etc. without presenting frequently occurring and annoying delays between consecutively presented views. This may result in that continuously zooming in or out of an image may be experienced as a presentation of a plurality of images with a long delay in-between images. Thus, no experience of continuous zoom is achieved, which may be irritating for the user. This may also result in erroneous handling or inputs by the user.

One common way to address this problem is either to increase the processing capacity of the device or to avoid operations in which the user expects an experience of continuous flow.

SUMMARY OF THE INVENTION

The various embodiments of the invention improve operations on images and improve the experience for the user of continuous operations on images.

This is achieved by methods for varying a view of a digital image to be sent to a display according to claim 1 and a data structure for storing a digital image on a handheld device according to claim 10. Further embodiments of the invention are disclosed in the dependent claims.

In particular, according to a first aspect of the invention, a method for varying a view of a digital image to be sent to a display, the method comprising:

retrieving image data representing a first area of the digital image from a reduced size, in regard of number of pixels, representation of the digital image, sending the retrieved image data representing the first area to the display, receiving a user input signal requesting a second area to be sent to the display, retrieving image data representing the second area of the digital image from the reduced size representation of the digital image, and sending the retrieved image data representing the second area to the display.

By manipulating the image view to be presented on a display in the reduced size representation of the digital image the manipulation requires less processing time and may therefore be performed in a short time. One reason for this is that there is no need to decode the entire full size image in order to present the new view in this embodiment.

In another embodiment the method further comprises receiving a user input signal requesting a third area to be sent to the display, and retrieving image data representing the third area of the digital image from a full size representation of the digital image if the third selected area indicates an area of the digital which in the reduced size image includes less number of pixels than the size of the display view.

In yet another embodiment the method comprises the act of start analyzing the image data of the full size representation of the digital image at a point of time after the digital image has been selected to be viewed and before the image data that is to be sent to the display is retrieved from a full size representation of the digital image.

In another embodiment the method comprises storing information resulting from the analysis.

In another embodiment the method comprises using information from the analysis of the image data of the full size representation of the digital image in case of the image data to be sent to the display is determined to be retrieved from a full size representation of the digital image.

By using the analysis information during manipulating the image at a point when the resolution of the reduced size image is not enough to provide acceptable quality the speed of manipulating the image may still be high though the image data has to be retrieved from the full resolution image.

According to another aspect of the invention a method for varying a view of a digital image to be sent to a display comprises:

retrieving image data representing a first area of the digital image from a reduced size, in regard of number of pixels, representation of the digital image, sending the retrieved image data representing the first area to the display, receiving a user input signal requesting a second area to be sent to the display, retrieving image data representing the second area of the digital image from a full size representation of the digital image by utilizing information from an analysis of the full size image, and sending the retrieved image data representing the second area to the display.

In one embodiment the method further comprises analyzing the image data of the full size representation of the digital image at a point of time before the digital image has been selected for viewing.

In another embodiment of the method the first area represents a subset of the total reduced size image.

In yet another embodiment of the method the second area represents an enlargement of objects in the first area.

In another embodiment of the method the second area indicates an area at a different position within the digital image in relation to the first area.

In another embodiment of the method the reduced size representation of the digital image is of a size of a factor k larger than the size of the display view, the factor k≥1.

In another embodiment of the method the full size representation of the image data is stored as a compressed image, wherein the analyzing the image data of the full size representation of the digital image includes generating at least one indicator to a data block within the full size representation of the digital image, and wherein the generated at least one indicator is used to access the image data of the selected area when the image data to be sent to the display is determined to be retrieved from a full size representation of the digital image.

In another embodiment of the method the indicator to a data block is to the first data unit of a Minimum Coded Unit, MCU.

In another embodiment of the method the information from the analysis of the image data includes an absolute DC coefficient of the first data blocks of each color component in the MCU.

In another embodiment of the method there is at least one indicator to a data block in each MCU scan line.

In another embodiment of the method a data block is a data unit in a JPEG encoded image.

In another embodiment of the method the method is performed in a server arranged remote from the handheld device and wherein the sending of the retrieved image data representing an area to be displayed is sent to the display via a network.

In another embodiment the method further comprises generating and displaying an animated transition between the displayed first area and the displaying of the second area.

According to yet another aspect of the invention a data structure for storing a digital image on an electronic device comprises:

image data representing a full size image of the digital image being stored on the electronic device, image data representing a reduced size image of the digital image being stored on the electronic device and having a size of a factor k larger than the size of the display view of the electronic device, the factor k≥1, the size of the images and the display being measured in pixels, and the full size image being connected to the reduced size image.

In one embodiment of the data structure the image data representing the reduced size image is stored in a data area dedicated for information relating to the digital image.

In another embodiment of the data structure the data area dedicated for information relating to the digital image is a header portion of an image file including the digital image.

In yet another embodiment of the data structure the image data representing the reduced image is arranged in a data area of a database entry referring to the image data of the full size image.

In another embodiment of the data structure the image data representing the reduced size image comprises non-differential DC-coefficients valid for compressed image data representing the full size image.

In another embodiment of the data structure the image data representing the full size image is in a compressed format represented as a sequence representing sequential image blocks, each block comprising one or more data units and each data unit being represented as a Variable Length Coded sequence of coefficients of basis functions.

In another embodiment of the data structure the data area further comprises indicators indicating the position of image blocks in the sequence.

In another embodiment of the data structure the data area further comprises indicators indicating the position of at least every sixty fourth image block in the sequence.

In another embodiment of the data structure the data area further includes indicators to at least one DC-coefficient of each image block of the sequence.

According to yet another aspect of the invention the method for preparing a digital image for manipulation comprises:

retrieving information speeding up analysis of a compressed full size image, analyzing the full size image utilizing the information speeding up analysis of a compressed full size image and compressed image data of the full size image, and storing features, resulting from the analyzing, facilitating fast manipulation of the full size image.

In one embodiment of the method the compressed full size image is in a compressed format represented as a sequence representing sequential image blocks, each block comprising one or more data units and each data unit being represented as a Variable Length Coded sequence of coefficients of basis functions and wherein the information speeding up analysis of a compressed full size image includes indicators to image blocks.

In another embodiment of the method indicators to at least every sixty fourth image block of the compressed full size image is included in the information speeding up analysis of a compressed full size image.

In yet another embodiment of the method the information speeding up analysis of a compressed full size image further includes DC-coefficients.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described in further detail by way of example under reference to the accompanying drawings, on which.

DETAILED DESCRIPTION OF A PREFERRED EMBODIMENT

In the following description the invention is described by way of example as being used on a mobile telephone. However, the invention may be used for presentation and manipulation of images displayed by other hand held electronic devices such as personal digital assistants (PDA), palm tops, etc. or displayed on personal computers, terminals, etc connected to servers performing operations for manipulating the view of images is performed on a server having limited processing resources in view of the load of the server. Manipulation of the view of the image may include zoom in and out within the image, pan within the image, and rotation.

Figure 1:
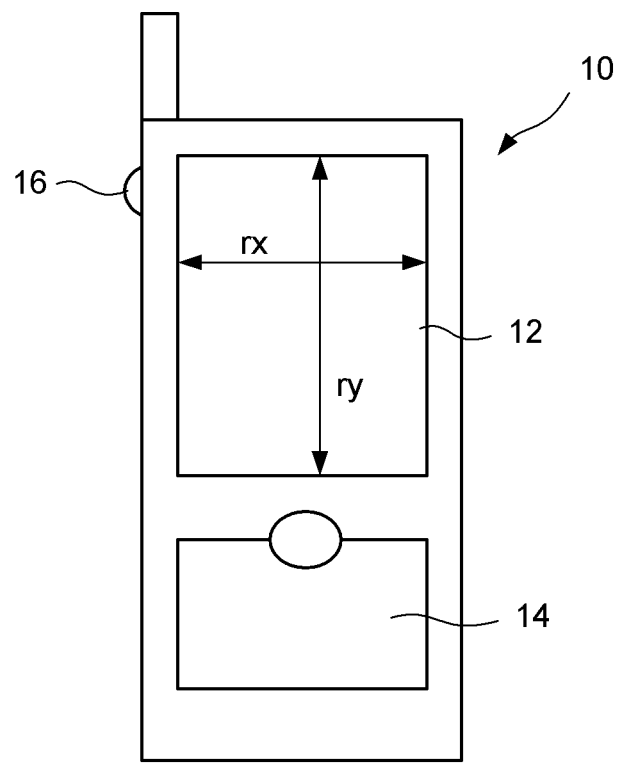
FIG. 1 shows a schematic view of an outer casing of a mobile phone.

Now referring to FIG. 1, according to one embodiment of the invention a mobile telephone 10 implementing the invention may include a display presenting a display view 12 and a user input means 14.

The display view 12 is arranged to have a resolution in an x direction of rx and a resolution in a y direction of ry, i.e. the display is arranged to present a matrix of image pixels wherein each row has a length of rx pixels and each column has a length of ry pixels. When referring to presenting an image or image data on a display or a display view in the following description the display or the display view should be interpreted as the area of the display arranged for presenting the image or the image data.

The user input means 14 may be any known means used to control the telephone. For instance, it may be keys on the telephone, a touch screen, i.e. input via the display, a touch pad, an external mouse or joystick, etc. In the context of the present invention the input means is used to control the manipulation of the view of the image.

Moreover, the mobile phone may include an optical input 16 such as a lens arranged to capture light for generation of still images or video images.

Figure 2:
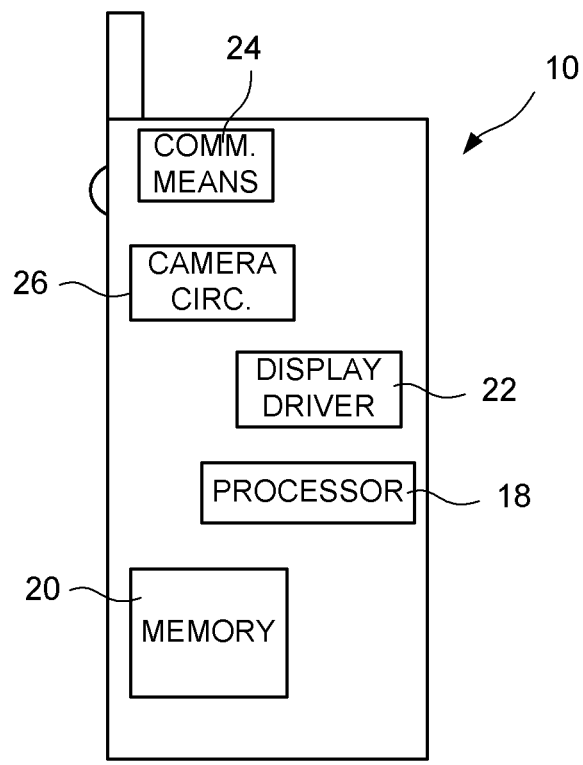
FIG. 2 shows a schematic view of functional blocks of a mobile phone.

Now referring to FIG. 2, according to one embodiment the mobile telephone includes a processor 18, e.g. a micro processor, a CPU etc., a memory 20, a display driver 22, a communication means 24, and a camera circuit 26. The processor 18 is arranged to execute software implementing at least part of the invention, of course the method implemented by the software may be implemented by other means, e.g. by electric circuitry.

The memory 20 may be a volatile memory, e.g. a Random Access Memory (RAM), a non volatile memory, e.g. a Read Only Memory (ROM), a flash memory, etc., or the memory 20 may be one volatile memory and one non volatile memory. In view of the present invention the memory 20 is arranged to store the software implementing at least part of the invention and to store image data for processing.

The display driver 22 is arranged to control the pixels of the display 12 in response to display instructions from the processor. The display driver 22 may be any display driver compatible with the specific display 12.

The communication means 24 is arranged to enable communications. The communication means may be implemented partly as software and partly as hardware.

The camera circuitry 26 includes an image sensor and the hardware and software required to generate images from the image sensor.

A mobile telephone includes further means and devices for its operation. However, in order to facilitate the understanding of the invention the means or devices not contributing to the understanding of the invention are not described.

Figure 3:
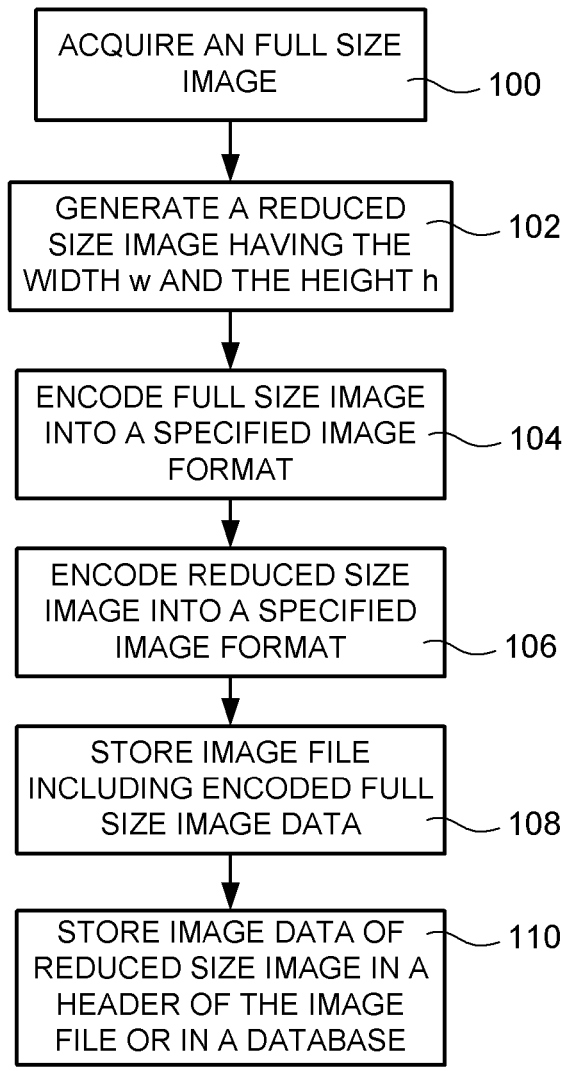
FIG. 3 is a flowchart of a method of generating an image file.

An image to be viewed on the mobile telephone 10 may be stored as an image file in the memory 20 of the mobile telephone 20. The image represented by the image file may be acquired by means of the optical input 16 and the camera circuitry 26. The image is stored in the image file as a full size image, which represents considerably more pixels than the display 12 of the mobile telephone 10 is able to display. In FIG. 3 an example of a method of generating an image file is schematically described.

Initially full size image is acquired, step 100. From the full size image a reduced size image having a width of w pixels and a height of h pixels is generated, step 102. Each of the width w and the height h of the reduced image is a factor k larger than the size of the corresponding width rx and the height ry, respectively, of the display 12. The factor k may, according to one embodiment of the invention, be in the range of 1-2. According to one embodiment the factor k is selected so that the height and width, respectively, of the reduced size image is of a size of n powers of two smaller than the full size image, wherein n may be any integer resulting in a reduced size image having width and height, respectively, that are as large as or larger than the width and height, respectively, of the view area of the display.

If the full size image is not already encoded and/or compressed, which it usually is, then the full size image is encoded and/or compressed, step 104, into a predetermined format, e.g. jpeg, tiff, gif, bit map format, proprietary format, etc. The reduced size image is also encoded and/or compressed, step 106, into a predetermined format, e.g. jpeg, tiff, gif, bit map format, proprietary format, etc. The full size image is then stored as an image file, step 108, and the reduced size image is stored as file information relating to the image file, step 110. The reduced size image may be stored in a header of the image file or in a database. In case of the reduced size image being stored in a data base information relating the reduced size image to the image file may be stored in the data base, information relating the image file to the reduced size image in the data base may be stored in a header of the image file, or information relating the image file and the reduced size image to each other may be stored both in the data base and in a header of the image file. Yet another way of linking a reduced size image in a data base to the full size image by knowledge of the file of the full size image. This may, for instance, be achieved by using a hash code computed from the filename of the full size image and or using the capturing date. Then the reduced size image may be stored in a file system with the hash code as part of its filename.

Figure 4:
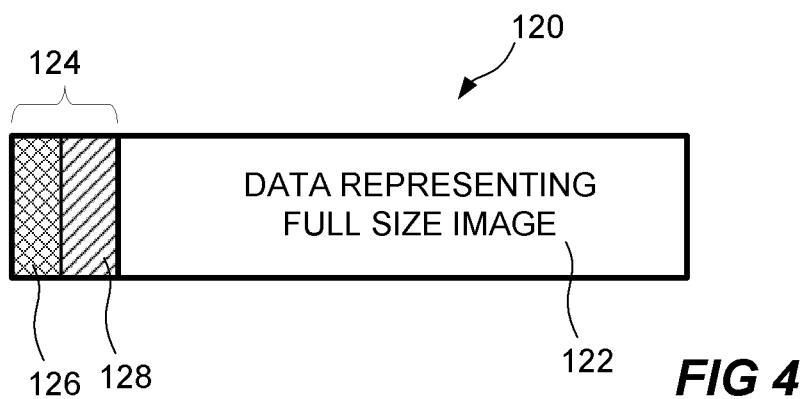
FIG. 4 shows a structure of an image file according to one embodiment.

The structure of an image file 120 according to one embodiment of the invention is shown in FIG. 4. The full size image is stored as encoded or compressed image data 122. In addition the image file 120 includes a header 124. The header 124 includes image and/or file information in a section 126. Image information and file information may be information relating to time and date of the production of the image, settings of the camera when capturing the image, camera model and type, the time and date when the file where last changed, the size of the image file, etc. Moreover, the header may include image information making it possible to speed up viewing, zooming and panning of the full size image or include image information speeding up analysis of the full size image. In a section 128 of the header 124 the reduced size image may be stored as image data. The reduced size image may be encoded or compressed.

Moreover, the reduced size image may be generated in any known way. For instance if the reduced size image is to be generated from a non compressed or decompressed image a scheme like nearest neighbor, bilinear or bicubic resampling may be used. However, if the image is compressed using JPEG the reduced size image may be generated by decoding only DC-coefficients and/or a limited number of AC coefficients, where the decoding to desired resolution/scale is performed by using only the frequencies needed for the desired resolution/scale.

By storing a reduced image having a size k times the size of the display, as previously described, initial manipulation of the image, such as zooming and panning, may be performed without requiring the user to wait for the processor to decode or decompress the image. Thus the response to a manipulation instruction from the user is substantially immediate and essentially no waiting time is experienced.

The image information making it possible to speed up viewing, zooming, panning and rotating, also called manipulating, of the full size image may include, in the case of the image being compressed by means of JPEG or a similar compression scheme, indicators for direct access to one or a plurality of individual Minimum Coded Units (MCUs) together with absolute DC-coefficients of each first data unit of the MCU's color components or channels. According to an alternative embodiment the image information making it possible to speed up manipulation of the full size image may also include indicators to each of the other data units of the MCU.

An indicator should, if not specified, be understood as an absolute or relative address to the indicated bit in a data stream or a marker in a bit stream.

Figure 5A:
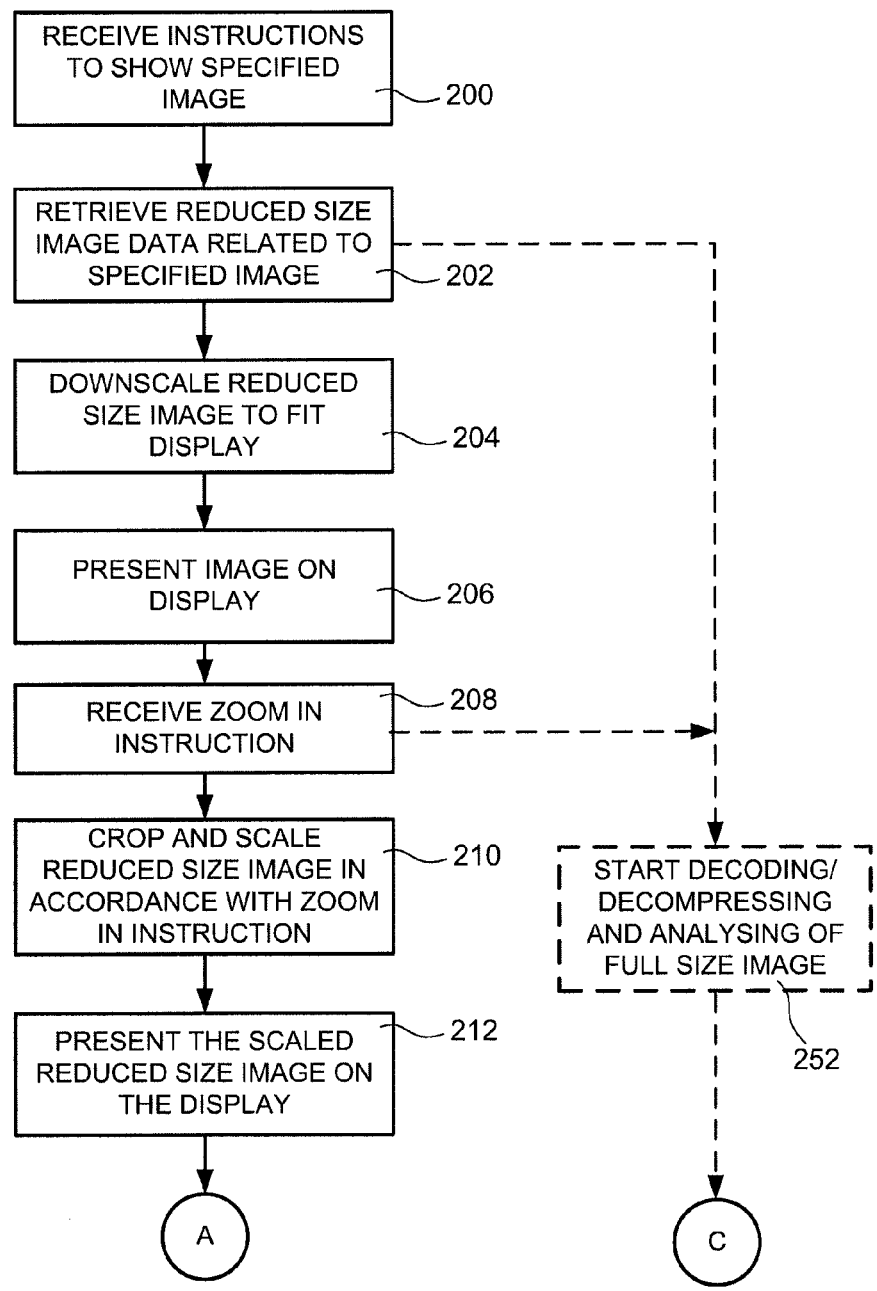
FIGS. 5a-c are flowcharts of a method for performing manipulations of an image view according to one embodiment of the invention.
Figure 5B:
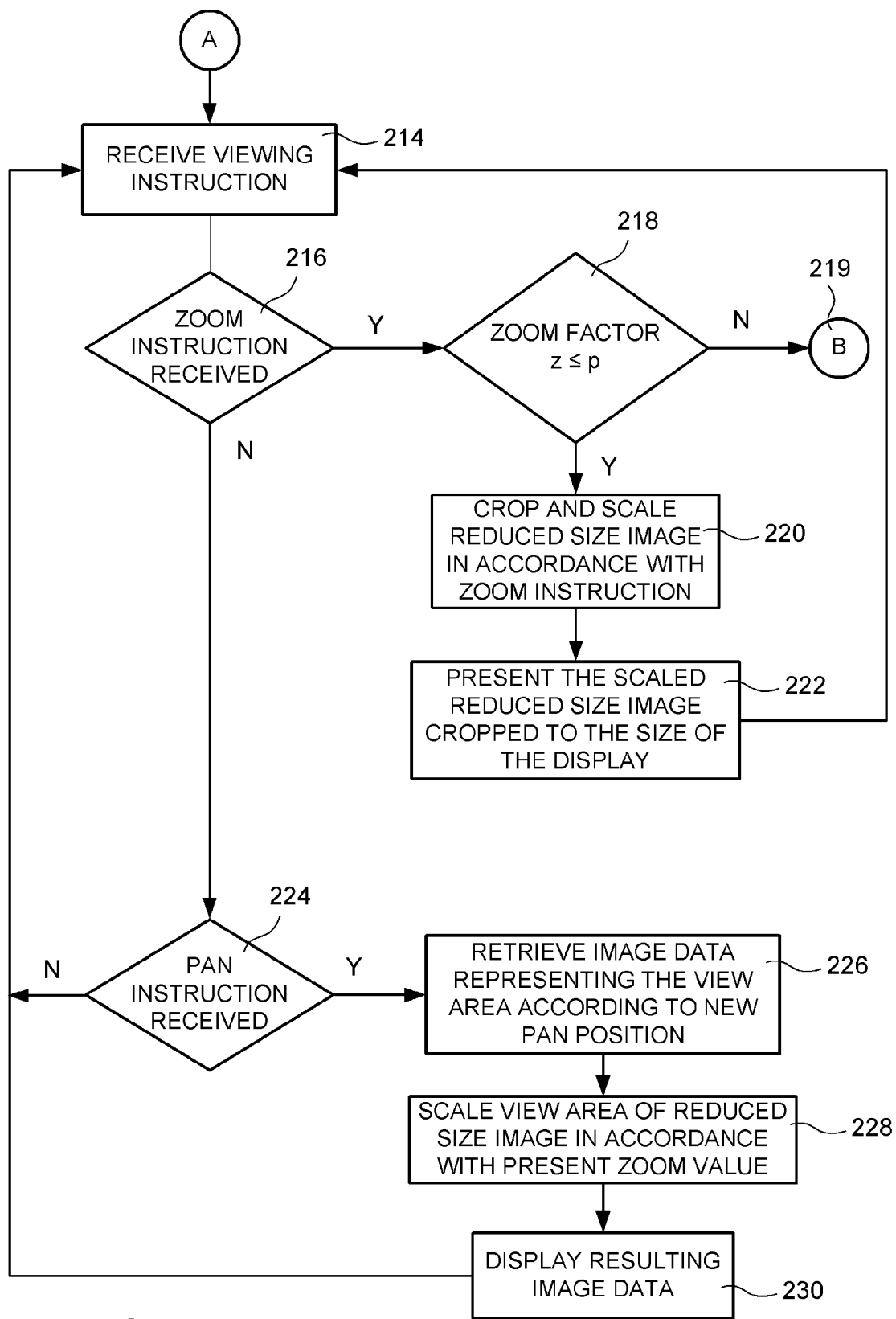
Figure 5C:
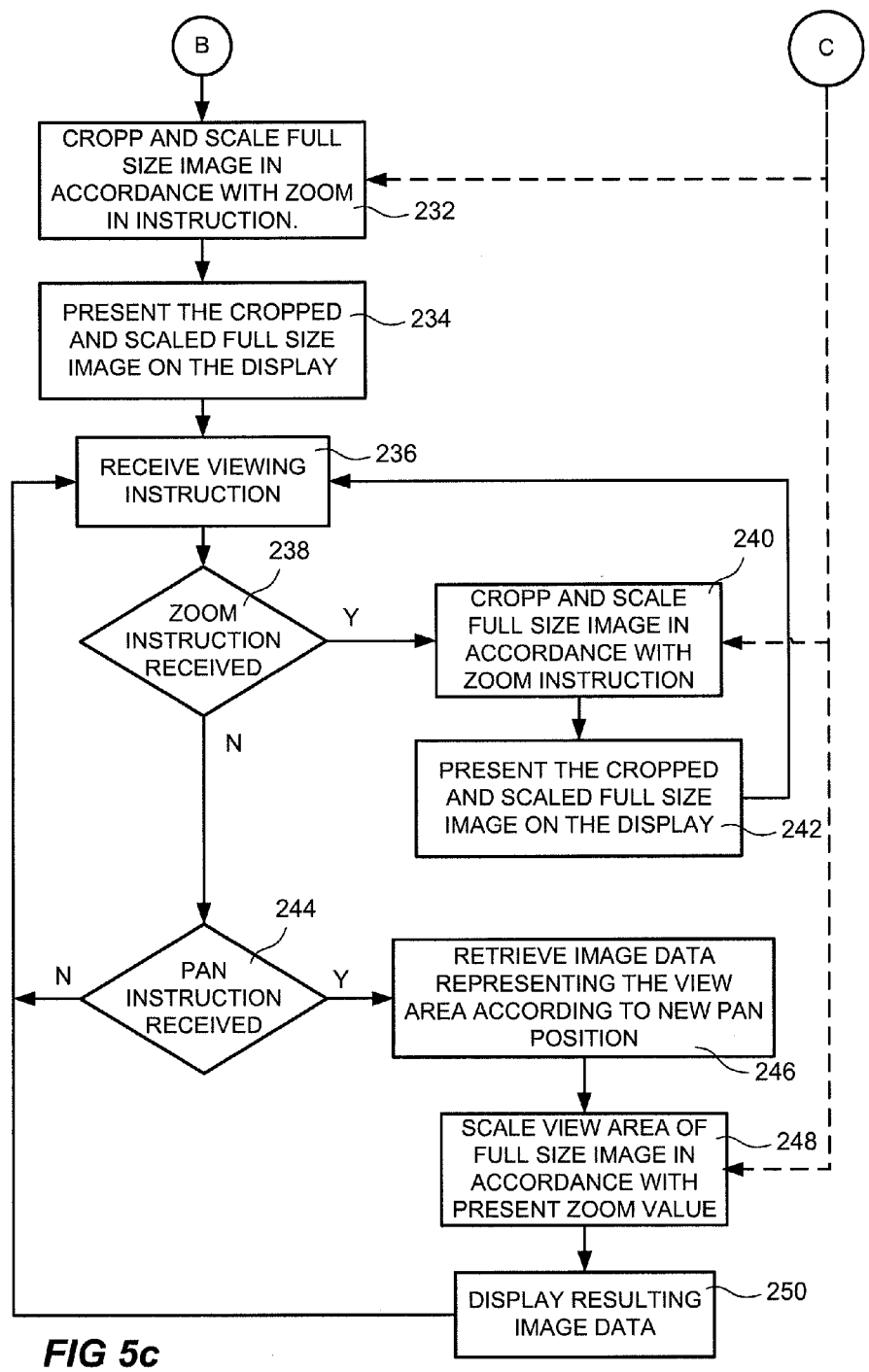

A method for performing the manipulations according to one embodiment of the invention is described in FIGS. 5a-c. The user initially selects an image to be presented on the display by manipulating the input means of the mobile telephone. Then an instruction is received by the mobile telephone receives the instruction to show the specified image, step 200. In response to this instruction the mobile telephone retrieves the reduced size image related to the specified image, step 202, and downscales it to fit the display, step 204, before the selected image is presented on the display of the mobile telephone, step 206.

Now the selected image has become visible on the display and the user is interested in viewing a specific detail of the image. Accordingly, the user indicates that he wants to zoom into the image. The zoom in instruction is received by the mobile telephone, step 208, and the processor crops and scales the reduced size image in accordance with the zoom instruction, step 210 to fit the display view. It is possible to zoom in using the reduced size image and depending on the embodiment it is either by using a reduced size image being larger than the display size or by allowing enlargement of reduced size images more than a one to one scale limit, e.g. in some applications an enlargement of up to 25%-30% is acceptable. Hence, the zoom operation becomes fast because the number of pixels to consider is few and the reduced size image do not have to be decompressed. Then the image resulting from the scaling in step 210 is presented on the display, step 212. Now that the image has been zoomed one time it becomes possible to pan within the image as well. The user may now zoom in further, zoom out, or pan. Let us assume that the user decides to zoom in further. The mobile telephone receives the instruction, step 214, and identifies the instruction as a zoom in instruction, step 216. Then the resulting zoom factor z is checked, step 218. If the zoom factor z is of a value greater than p then the expected view require such magnification that the reduced size image is not possible to use to provide acceptable or required quality and therefore the process continues to step 219 in order to start using the full size image instead. If the zoom factor z is of a value less than or equal to p then the reduced size image still is used and the process proceed to step 220. The zoom factor z may be a value indicating how much scaling of the reduced size image that is required in order to present the image requested by the user. For example, if the size of the reduced size image, i.e. w and h in pixels, is two times the size of the display view, i.e. rx and ry in pixels, then the zoom factor z initially, when the entire image is to be displayed, is ½. Hence, in such an embodiment the zoom factor correspond to a scaling factor that is to be applied to the reduced size image in order to present an image being zoomed to a degree requested by the user. In other words in the example of the reduced size image being two times the size of the display and no zoom is requested then w/2=rx and h/2=ry, i.e. w-z=rx, h-z=ry and z=½. Moreover, when the requested zoom is of such a value that one pixel of the reduced size image correspond to one pixel of the display, then z=1. The value of p, defining the limit for the use of the reduced size image, may be 1, i.e. p=1. However, in some applications it is possible to even enlarge reduced size image past the zoom factor z=1 without notable effects and in such cases p may be set to a value of 1.25, i.e. the image presented on the display may be a 25% enlargement of the reduced size image. Enlargements of the reduced size image may be acceptable up to a height and width, respectively, about 1.5 times larger than the unscaled size.

Now let us return to FIG. 5b and assume that the zoom factor z is less than or equal to p, then the reduced size image is cropped and scaled, once more, in accordance with the zoom instruction, step 220, and then the resulting image is presented on the display, step 222. The process then returns to step 214 ready to receive a new instruction. If the zoom factor z is greater than p then the process switches to the full size image, which is described below in connection with FIG. 5c.

If the received instruction relates to a pan manipulation of the image view, step 224, then a new position of the image view, i.e. an view area corresponding to a portion of the entire image that is displayed, within the image is provided in connection with the instruction and the image data representing the view area is retrieved from the reduced size image, step 226. The image is then cropped and scaled in accordance with the present zoom selection, step 228, and displayed on the display, step 230. The process then returns to step 214 ready to receive a new instruction.

In FIG. 5c the process of manipulating the image view when the image has been zoomed in past the limit for changing from generating the displayed image view from the reduced size image to generating the displayed image view from the full size image. Hence, when the zoom into the image has past the limit given in FIG. 5b, step 218, the full size image is retrieved, cropped and scaled in accordance with the zoom instructions, step 232. Then the scaled full size image is displayed on the display, step 234. The process is then ready to receive further image view manipulation instructions, step 236. If the next received instruction is a zoom in instruction, step 238, the full size image is cropped and scaled in accordance with the zoom instruction, step 240 and the scaled full size image is displayed, step 242. The mobile phone is then ready to receive the next instruction, step 236.

If the instruction received in step 235 is a pan instruction, step 244, then a new position of the image view, i.e. a view area corresponding to a portion of the entire image that is displayed, within the image is provided in connection with the instruction and the image data representing the view area is retrieved from the full size image, step 246. The image is then cropped and scaled in accordance with the present zoom selection, step 248, and displayed on the display, step 250. The process then returns to step 236 ready to receive a new instruction.

Figure 6A:
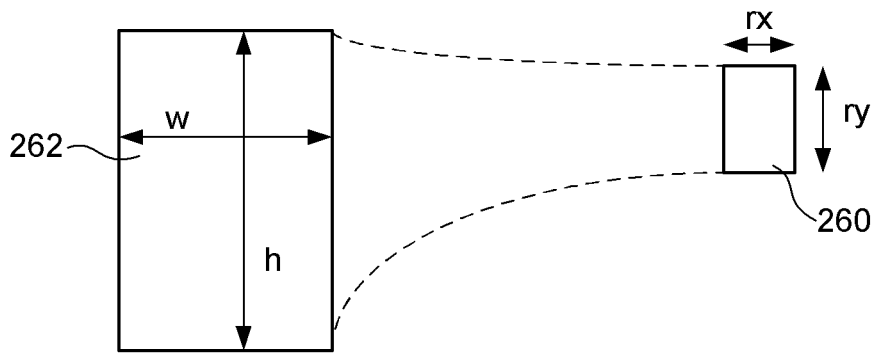
FIGS. 6a-f show schematic overviews of the relation between a reduced size image, a full size image and a display view.

In FIGS. 6a-f an overview of the relation between reduced size image, full size image and image view on the display is the schematically showed. The overview is also related to the method for performing the manipulations according to one embodiment of the invention as described in FIG. 5a-c. FIG. 6a depicts the relation between the image view 260 presented on the display and the reduced size image 262. The image view 260 is rx pixels wide and ry pixels high and the reduced size image 262 is w pixels wide and h pixels high. As previously mentioned the width w of the reduced size image 262 is a factor k times the width of the image view width rx and the height h of the reduced size image 262 is a factor k times the height of the image view height ry. Hence, an initial image view 260 that are supposed to display the entire image is generated by scaling down the reduced size image 262 to fit the display, i.e. to the size of the image view.

Figure 6B:
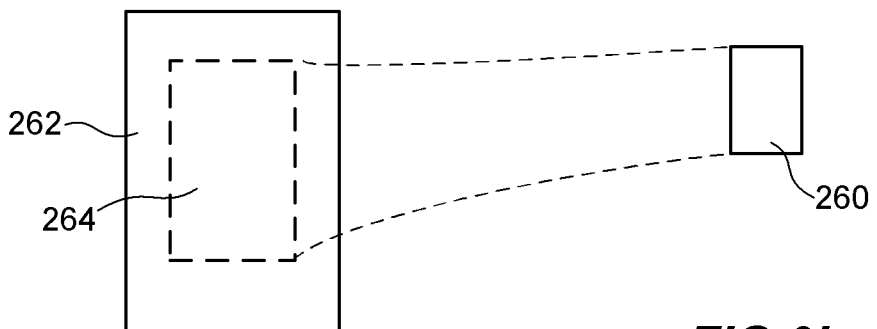

FIG. 6b depicts the situation where the image is zoomed in and the image data to be displayed in the image view 260 still is retrieved from the reduced size image 262. As seen in FIG. 6b a zoom in resulting from one or a plurality of zoom in instructions is an area 264 containing fewer pixels than the entire reduced size image 262. Thus, the generation of the image view 260 includes scaling down the image within the area 264 to fit the display.

Figure 6C:
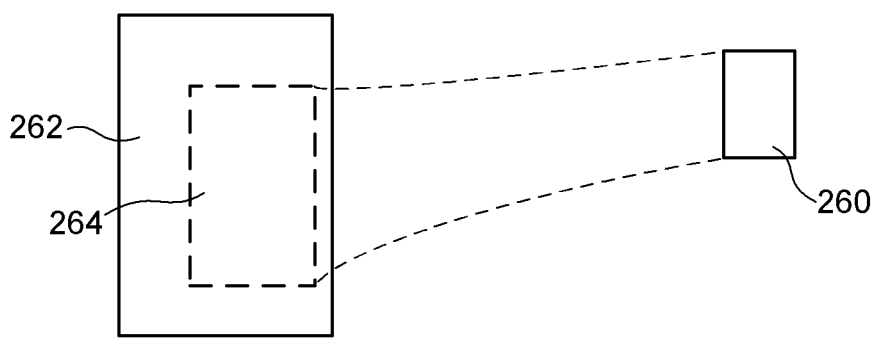

FIG. 6c depicts a situation where the zoomed image is panned, i.e. the area 264 intended for the display is moved within the area of the image.

Figure 6D:
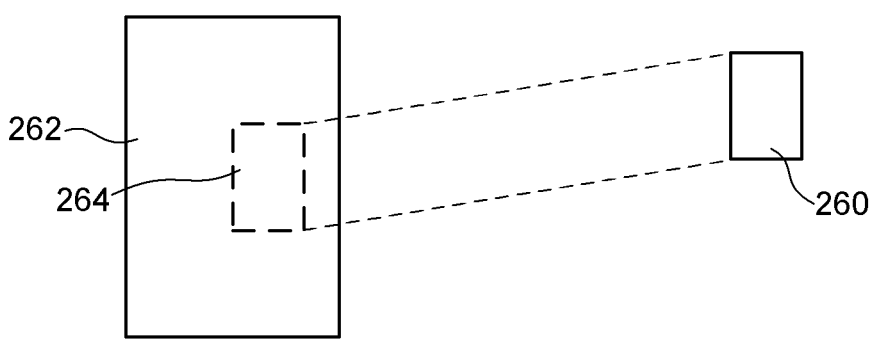

FIG. 6d depicts a situation where the zoom in has resulted in an image area 264 of the same size as the display, in view of the height and width in number of pixels. In this situation no scaling is performed of the area intended to be displayed.

Figure 6E:
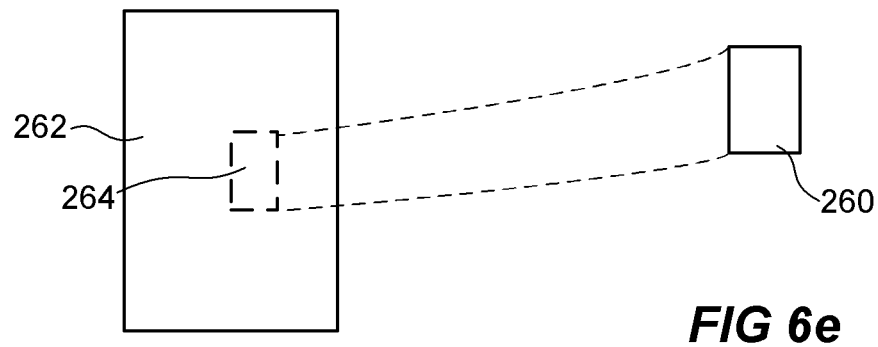

FIG. 6e depicts a situation where the zoom in has resulted in an image area within the reduced image that is smaller than the image view and, therefore, the image area 264 of the reduced size image has to be scaled up to the size of the image view 260. This results in a presentation in the image view that does not fully use the resolution of the display. However, this may be acceptable in situations where the loss of the experienced quality is small.

Figure 6F:
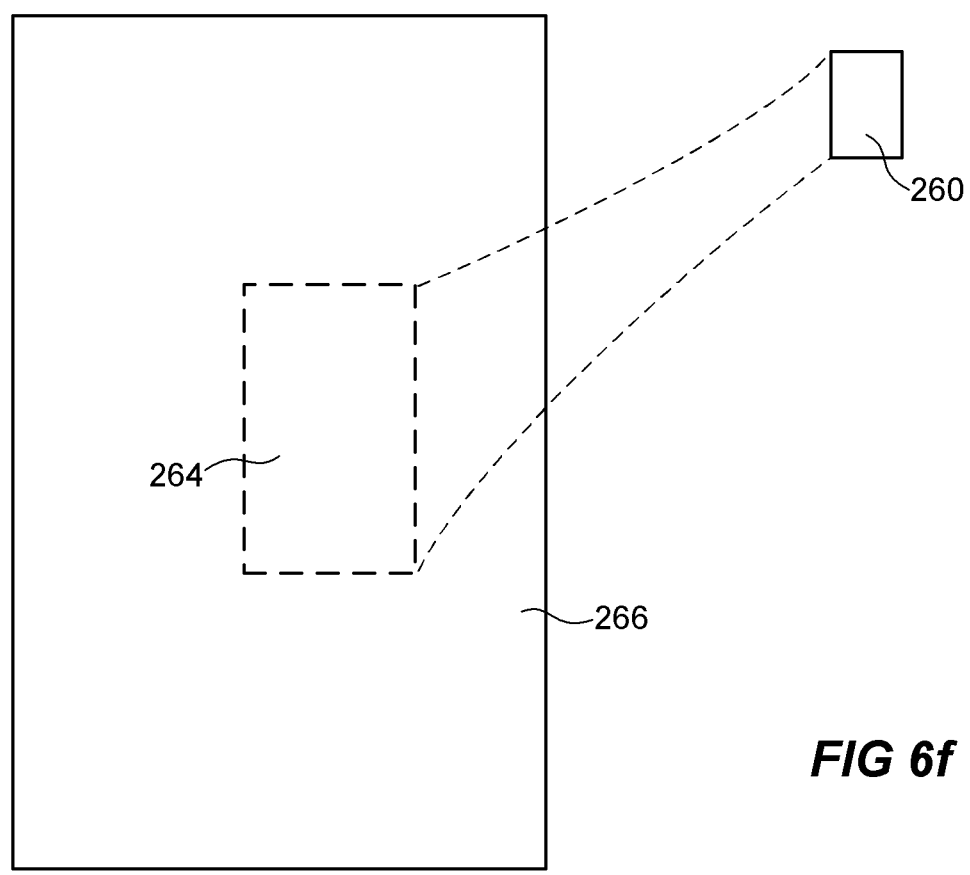

FIG. 6f depicts a situation where image information to be displayed is retrieved from the full size image 266 in stead of from the reduced size image due to the zoom manipulations has reached such a level that the reduced size image no longer is able to provide acceptable quality. As a result of the change to the full size image 266 the image area now has to be scaled down again in order to fit the display.

By using the reduced size image the manipulation of the image view relating to a specific image becomes faster and the response times from the moment a user indicates a manipulation until the manipulation is performed becomes shorter in relation to if a compressed full size image should be used. One reason for this is that in the systems of today the entire set of image data representing the image has to be decoded every time a manipulation of the image view is to be performed if a compressed full size image is used. This is very time consuming. If the image data is decompressed once and all the manipulation is performed on the decompressed image data then the time is not such a great issue anymore, however, a decompressed image would occupy a large memory area, approximately 6-20 times the memory area occupied by the compressed image. Moreover the initial decoding of a full size image would take much longer time than the total time for analysis and decoding of a few selected areas.

However, as described in the process above it is not satisfactory to process and present image data from the reduced size image when image view to be displayed is zoomed in to such extent that the image data of the reduced size image is not possible to use for generating an image view of desired quality. At this point it is suggested to start processing the image data of the full size image instead. Hence, the problem of the slow processing of a compressed image will be present when the image is to be zoomed deep into details of the image.

In order to overcome the problem of delays, i.e. compressed full size image being time consuming to process, and storage capacity, i.e. uncompressed image occupying a large image area, the full size image is analyzed and features facilitating fast manipulation of an image is stored in the image file, see description of FIG. 4, temporarily stored in the memory for the present manipulation, or stored as an entry in a database, the entry in a database may refer to the image file. A series of methods for analyzing, extracting and storing such features relating to an image is described in the patent application WO 2005/050567 by Scalado A B, which is hereby incorporated by reference in its entirety.

In order to extract the features facilitating fast manipulation of an image, the features may either be extracted during compression of the image or may be extracted during a post compression analysis of a compressed image. In case of the full size image being compressed using JPEG compression, or a similar compression method, the features facilitating fast manipulation of an image retrieved and stored may be any single one of or any combination of indicators to MCUs, a MCU being small image blocks of the image, indicators to one or a plurality of data units, a data unit being a data block representing one channel or color component of the MCU, one or a plurality absolute or relative DC-coefficients of one or a plurality of the color components of the retrieved MCUs and/or of the retrieved data units, or number of bits between data units, or between specific coefficients of the data units. How to use such features to achieve fast manipulation of an image is described in the above mentioned application, i.e. WO 2005/050567 by Scalado A B.

In one embodiment, as mentioned previously, information speeding up analysis of full size image may be connected to the image, e.g. by storing the information in the file or by referring to a location where the information relating to the particular image is stored.

One example of information speeding up analysis is data units of an image compressed using JPEG compression, or a similar compression method. By storing indicators to at least some data units of the compressed full size image there may be no need to decode Variable Length Coded portions of the data units during analysis of the compressed full size image. Variable Length Coded portions may be coded and decoded in accordance with any Variable Length Code, e.g. Huffman Code, Arithmetic Code, etc. Hence, speeding up the analysis process. In one particular embodiment an indicator to each data unit of the compressed full size image is stored. Thereby there is no need to decode the Variable Length Coded portions in order to locate the data units.

By knowing the location of the data units it is possible to decode the differential DC-coefficients rapidly, as the DC-coefficients are the first coefficient of a data unit, and thereby enable creation of a table or a list of absolute DC-values. This allows random access to any of the data units in the image and it allows skipping time consuming Variable Length Codes during decoding of an image for display in less detail.

Another example of information speeding up analysis is a combination of storing indicators to data units as described above and storing at least some of the DC-coefficients, preferably DC-coefficients related to data units represented by a stored indicator. By storing these features it becomes possible to directly generate the analysis features from the information speeding up analysis. In an embodiment where all the data units and DC-coefficients of the full size image are stored as information speeding up the analysis table may be generated without any decoding at all or with minimal effort.

In yet another example DC-coefficients of the full size image are stored as image data or part of image data in the reduced size image. Thus, when the DC-coefficients are needed they are retrieved from the data representing the reduced size image.

The indicators to data units may be absolute, i.e. the absolute position in the file is given, or relative, i.e. the position of the data unit within the image file is given in relation to previous data unit, or some other position indicator. Absolute indicators are advantageous in that each data units may be independently and directly accessible. Relative indicators are advantageous in that each indicator may be described using less memory space.

As discussed above the features facilitating fast manipulation of the full size image may be extracted during a time period starting after the image has been selected for viewing and connected to the image file selected for viewing, i.e. the image specified in step 200 in FIG. 5a, then the compressed image may be analyzed during the process of manipulating the image using the reduced size image. Decompression and/or analyzing of the compressed full size image, step 252 in FIG. 5a, in order to retrieve the features may be started as soon as the image to be viewed is selected or as soon as a first zoom instruction relating to the image has been received. Waiting for the first zoom instruction may be advantageous in that no processing of the large size image is initiated until the user indicates an interest in manipulating the image and thus the risk of wasting processing capacity on an images viewed during browsing through the images is decreased. By performing the analysis in parallel with the manipulation it may be possible to achieve non delayed transition between manipulation of the reduced size image and the full size image, if the analysis is finished before the full size image has to be used for the manipulation, and then, by means of the features retrieved from the analyze, continue fast manipulation of the image. Moreover, according to one embodiment an animation of the manipulation may be showed when the analysis is performed or during intervals when the analysis is performed. For instance an animated zoom in effect may be showed in connection with a zoom in manipulation, an animated rotating effect may be showed in connection with a rotation manipulation, an animated sliding effect may be showed in connection with a pan manipulation. Thereby the risk of the user experiencing a delay becomes minimal.

In another embodiment indicators to one or a plurality of MCUs and at least one absolute DC-coefficient relating to each of color components of the MCUs may be included in the image information speeding up analysis of the full size image. By including these features an initial analysis may be performed on the zoomed in image area only, hence, resulting in fast analyzing as it is possible to analyze only a portion of the image. At 200% zoom this results in approximately four times faster analysis than if the full image has to be analyzed. If the image view is panned only a portion of the image data of the new view is not analyzed and, thus, the analysis of the rest of the image data of the new view may be analyzed very quickly.

According to another embodiment of the invention the image information speeding up analysis of the full image are indicators to data units of the full size compressed image.

According to yet another embodiment of the invention the image information speeding up analysis of the full size compressed image are indicators to data units of the full size compressed image and absolute DC-coefficients related to the indicated data units.

The number of indicators to different MCUs stored as image information speeding up the analysis of the image may vary from each and every one of the MCUs, every second, every fourth, every eighth, etc. In one embodiment indicators to at least one MCU on each row of MCUs in the image is stored as image information speeding up the analysis of the image.

In one embodiment implementing any of the schemes of storing image information speeding up the analysis of the image as mentioned above, the size of the reduced size image may be set to the same size as the display.

According to another embodiment an image file as described above may not necessary be retrieved from the memory of the device presenting the image but may be downloaded via communication means, e.g. communications means 24 in the mobile phone of FIG. 2. Moreover, the image file may be stored at an external server and referred to in the handheld device by a reference stored in the handheld device. Additionally, information speeding up manipulation of the image may be stored at the external server.

The method of manipulating an image, i.e. performing a zoom or a pan or a tilt operation as described above, may be performed entirely on a device including the display. This device may for instance be a handheld electronic device arranged to display the image, e.g. the mobile telephone. In one embodiment the manipulation also includes the process of extracting features facilitating fast manipulation of the full size representation of the digital image.

According to another embodiment the method of manipulating an image may be performed entirely on an external server and the resulting view may be transferred to the handheld device. In this way it becomes possible for the external server to process a greater number of image manipulations during a specific time period, as only the requested areas need to be processed. The transfer of the resulting view may be performed via any network or combinations of networks, e.g. Internet, LAN, WAN, mobile telephone network, WIFI, land based telephone networks etc.

The invention claimed is:

1. A method comprising:
   receiving a selection of a digital image for viewing,
   retrieving, in response to the selection of the digital image for viewing, image data representing a first area of the digital image from a reduced size, in regard of number of pixels, representation of the digital image,
   sending the retrieved image data representing the first area to the display,
   comparing the retrieved first area image size to said display for determination of a relative size of the first area image versus the display;
   scaling up the size of said first area image to fit the display in an instance when the first area image is smaller than the display; and
   sending the scaled up first area image to the display;
   in an instance when the scaled up first area image cannot provide experienced image quality, retrieving second image data for said selected digital image area from a stored full size representation of the digital image and scaling down said second image data to fit said display;
   analyzing the full size representation of the digital image, stored as a compressed image, for retrieval of features facilitating fast manipulation of the full size representation of the digital image by indicating positions for data blocks in the full size representation of the digital image for use during decoding and retrieval of specific areas in the digital image, the act of analyzing being performed after the digital image has been selected for viewing and while said scaled down second image data is displayed, the act of analyzing includes generating at least one indicator to a data block within the full size representation of the digital image,
   wherein both the full size representation of the digital image and the reduced size representation of the digital image are stored in a device including said display and wherein the method is performed in said device.

2. The method according to claim 1, further comprising starting analysis of the image data of the full size representation of the digital image at a point of time after the digital image has been selected to be viewed and before the first area image data that is to be sent to the display is retrieved from the reduced size representation of the selected digital image.

3. The method according to claim 2, further comprising storing information resulting from the analysis.

4. The method according to claim 1, wherein said first area represents a subset of the total reduced size image.

5. The method according to claim 1, wherein said second area represents an enlargement of objects in said first area.

6. The method according to claim 1, wherein the reduced size representation of said digital image is of a size of a factor k larger than the size of the display view, the factor k≥1.

7. The method according to claim 1, wherein the indicator to a data block is to the first data unit of a Minimum Coded Unit, MCU.

8. The method according to claim 7, wherein said information from the analysis of the image data includes an absolute DC coefficient of the first data blocks of each color component in the MCU.

9. The method according to of claim 7, wherein there is at least one indicator to a data block in each MCU scan line.

10. The method according to claim 1, wherein a data block is a data unit in a JPEG encoded image.

11. The method according to claim 1, further comprising generating and displaying an animated transition between the displayed first area and the displaying of the second area.

12. The method according to claim 1, wherein the device is a mobile telephone.

13. The method of claim 1, wherein the device is one of a personal digital assistant (PDA), notebook computer, laptop computer, personal computer, terminal device, and mobile communication device.

14. The method of claim 1, wherein the apparatus is one of a personal digital assistant (PDA), notebook computer, laptop computer, personal computer, terminal device, and mobile communication device.

15. The method of claim 1, further comprising:
receiving, after initiating the act of analyzing, a user input signal requesting a second area, representing a portion of the displayed image to be sent to the display,
retrieving image data representing the second area of the digital image from the full size displayed representation of the digital image by utilizing said generated at least one indicator from the act of analyzing the full size representation of the digital image to access the image data of the selected area, and
sending the retrieved image data representing the selected area to the display.

16. An apparatus comprising at least a processor, a memory in communication with said processor, the memory having computer coded instructions therein, said instructions when executed by the processor causing the apparatus to perform:
receiving a selection of a digital image for viewing on a display;
retrieving image data representing a first area of the digital image from a reduced size, in regard of number of pixels, representation of the digital image;
comparing the retrieved first area image size to said display for determination of a relative size of the first area image versus the display;
scaling up the size of said first area image to fit the display in an instance when the first area image is smaller than the display; and
sending the scaled up first area image to the display;
in an instance when the scaled up first area image cannot provide experienced image quality, retrieving second image data for said selected digital image area from a stored full size representation of the digital image and scaling down said second image data to fit said display;
analyzing the full size representation of the digital image, stored as a compressed image, for retrieval of features facilitating fast manipulation of the full size representation of the digital image by indicating positions for data blocks in the full size representation of the digital image for use during decoding and retrieval of specific areas in the digital image, the act of analyzing being performed after the digital image has been selected for viewing and while said scaled down second image data is displayed, the act of analyzing includes generating at least one indicator to a data block within the full size representation of the digital image,
wherein both the full size representation of the digital image and the reduced size representation of the digital image are stored in a device including said display and wherein the method is performed in said device.

17. The apparatus according to claim 16, wherein said instructions cause the apparatus to further perform: starting analysis of the image data of the full size representation of the digital image at a point of time after the digital image has been selected to be viewed and before the first area image data that is to be sent to the display is retrieved from the reduced size representation of the selected digital image.

18. The method according to claim 16, wherein the apparatus is a mobile telephone.

19. The apparatus of claim 16 wherein the instructions further cause the apparatus to perform:
receiving, after initiating the act of analyzing, a user input signal requesting a second area, representing a portion of the displayed image to be sent to the display,
retrieving image data representing the second area of the digital image from the full size displayed representation of the digital image by utilizing said generated at least one indicator from the act of analyzing the full size representation of the digital image to access the image data of the selected area, and
sending the retrieved image data representing the selected area to the display.

20. A computer program product comprising at least a computer readable storage medium having computer coded instructions stored therein, said instructions when executed by a processor causing an apparatus to perform:
receiving a selection of a digital image for viewing on a display;
retrieving image data representing a first area of the digital image from a reduced size, in regard of number of pixels, representation of the digital image;
comparing the retrieved first area image size to said display for determination of a relative size of the first area image versus the display;
scaling up the size of said first area image to fit the display in an instance when the first area image is smaller than the display; and
sending the scaled up first area image to the display;
in an instance when the scaled up first area image cannot provide experienced image quality, retrieving second image data for said selected digital image area from a stored full size representation of the digital image and scaling down said second image data to fit said display;
analyzing the full size representation of the digital image, stored as a compressed image, for retrieval of features facilitating fast manipulation of the full size representation of the digital image by indicating positions for data blocks in the full size representation of the digital image for use during decoding and retrieval of specific areas in the digital image, the act of analyzing being performed after the digital image has been selected for viewing and while said scaled down second image data is displayed, the act of analyzing includes generating at least one indicator to a data block within the full size representation of the digital image, wherein both the full size representation of the digital image and the reduced size representation of the digital image are stored in a device including said display and wherein the method is performed in said device.

21. The computer program product of claim 20 further comprising instructions that cause the apparatus to perform: starting analysis of the image data of the full size representation of the digital image at a point of time after the digital image has been selected to be viewed and before the first area image data that is to be sent to the display is retrieved from the reduced size representation of the selected digital image.

22. The computer program product of claim 21, wherein the indicator to a data block is to the first data unit of a Minimum Coded Unit, MCU, and wherein said information from the analysis of the image data includes an absolute DC coefficient of the first data blocks of each color component in the MCU.

23. The computer program product of claim 20, further comprising instructions causing an apparatus to perform:

receiving, after initiating the act of analyzing, a user input signal requesting a second area, representing a portion of the displayed image to be sent to the display, retrieving image data representing the second area of the digital image from the full size displayed representation of the digital image by utilizing said generated at least one indicator from the act of analyzing the full size representation of the digital image to access the image data of the selected area, and sending the retrieved image data representing the selected area to the display.

* * * * *